United States Patent
Bilhan (12)

(10) Patent No.: US 9,231,409 B2
(45) Date of Patent: Jan. 5, 2016

(54) SOURCING AND SECURING DUAL SUPPLY RAILS OF TAMPER PROTECTED BATTERY BACKED DOMAIN

(71) Applicant: TEXAS INSTRUMENTS INCORPORATED, Dallas, TX (US)

(72) Inventor: Erkan Bilhan, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 394 days.

(21) Appl. No.: 13/744,664

(22) Filed: Jan. 18, 2013

(65) Prior Publication Data

US 2013/0187456 A1 Jul. 25, 2013

Related U.S. Application Data

(60) Provisional application No. 61/590,017, filed on Jan. 24, 2012.

(51) Int. Cl.
*H02J 4/00* (2006.01)
*G06F 1/26* (2006.01)
*G06F 21/86* (2013.01)

(52) U.S. Cl.
CPC ... *H02J 4/00* (2013.01); *G06F 1/26* (2013.01); *G06F 21/86* (2013.01); *Y10T 307/383* (2015.04)

(58) Field of Classification Search
CPC ............... H02J 4/00; G06F 21/86; G06F 1/26
USPC .......................................................... 307/28
See application file for complete search history.

(56) References Cited

U.S. PATENT DOCUMENTS

| | | | |
|---|---|---|---|
| 5,182,464 A * | 1/1993 | Woodworth et al. | 307/87 |
| 2004/0169421 A1* | 9/2004 | Eaton et al. | 307/64 |
| 2009/0167093 A1* | 7/2009 | Nguyen et al. | 307/80 |
| 2010/0065349 A1* | 3/2010 | Ichikawa et al. | 180/65.1 |
| 2010/0148580 A1* | 6/2010 | Taniuchi | 307/29 |

* cited by examiner

*Primary Examiner* — Rexford Barnie
*Assistant Examiner* — Terrence Willoughby
(74) *Attorney, Agent, or Firm* — Robert D. Marshall, Jr.; Frank D. Cimino

(57) ABSTRACT

This invention is a System On a Chip (SOC) requiring two tamper resistant externally generated power supplies. A first, higher power supply powers I/O and analog circuits. A second, lower power supply powers digital circuits and memory. A first voltage monitor circuit powered by said first power supply generates a first output signal when the first power supply is below an operational limit high level. A second voltage monitor circuit powered by said first power supply indicates when the second power supply is above an operational high limit level. A power switch is controlled by the first voltage monitor circuit. This power switch connects the second power supply and second load when closed and isolates them when open. Thus the memory cannot be accessed when the I/O and analog power supply is out of specification.

6 Claims, 1 Drawing Sheet

SOURCING AND SECURING DUAL SUPPLY RAILS OF TAMPER PROTECTED BATTERY BACKED DOMAIN

CLAIM OF PRIORITY

This application claims priority under 35 U.S.C. 119(e)(1) to U.S. Provisional Application No. 61/590,017 filed Jan. 24, 2012.

TECHNICAL FIELD OF THE INVENTION

The technical field of this invention is tamper protection systems with dual (analog and digital) battery backed power supplies.

BACKGROUND OF THE INVENTION

Secure systems store secret information pertaining operation of a device on the SOC (system on chip). Tamper protection systems monitor environmental and operational conditions of the SOC in order to remove this secret information if any tamper condition is detected.

Previous solutions use a single rail and an internally generated second rail.

SUMMARY OF THE INVENTION

This invention is a method to externally supply dual voltage rail to a secure domain that is protected against individual supply attacks, without duplicating on chip monitor circuits on both supply domains.

This invention assigns a high voltage (HV) analog supply as the master supply for the secure domain and internally switches in a second low voltage (LV) digital supply rail depending on the status of the HV rail. This allows having tamper monitor circuits to be on the HV domain while logic and memory is on the low voltage (LV) domain.

BRIEF DESCRIPTION OF THE DRAWINGS

These and other aspects of this invention are illustrated in the drawings, in which.

DETAILED DESCRIPTION OF PREFERRED EMBODIMENTS

Prior art system solutions developed for SOCs (System on Chips) are typically implemented on CMOS process nodes that employ HV transistors and low leakage digital circuits. These systems can directly connect to battery voltage. Voltages for the digital circuits power supply and if needed an analog circuits power supply can be generated internally without loss of systems efficiency. These systems only need to observe tamper conditions on one externally sourced supply rail.

Newer SOCs are implemented on CMOS process nodes that lack HV components. The absence HV components of prohibits direct battery connection. The increased leakage of digital circuits on these process nodes require the digital power supply to be generated using a Switched Mode Supply to improve system's power efficiency. Thus these newer systems require both analog (HV) and digital (LV) supply rails sourced externally. In this case both of supply rails have to be secured against any tamper attempts which may involve applying lower or higher voltage, temperature or frequency than the defined operational limits in order to put system in vulnerable or undefined state to access the secret information.

This invention permits secure sourcing dual rails from an external SMPS to the system. This invention does not allow sourcing of the digital supply, which stores the secret information to be protected, while the analog/tamper sensor supply is out of specification. This invention does not require duplicate tamper monitor circuits on both voltage domains. Thus this invention saves area and power while maintaining system security.

Secure applications such as point of sale devices typically store sensitive information in a battery backed domain (BBD). Tamper protection circuits and methods are generally used to protect this stored information against theft and tampering. These circuits monitor supply rails, temperature, wire meshes and the like.

Current secure applications use dual supply rails in the BBD. These dual supply rails include a high voltage supply for input and output (IO) pins and analog circuits and a low voltage supply for digital circuits and memory. On chip voltage monitor circuits determine if the supply levels are within the specified levels and identify attacks and protect system against it. The voltage monitor circuits detect the absence of a power supply or the presence of a non-operational level upon one of the power supply rails. Chip security requires the status of the power supply rails to be known and available on both supply domains.

Figure 1:
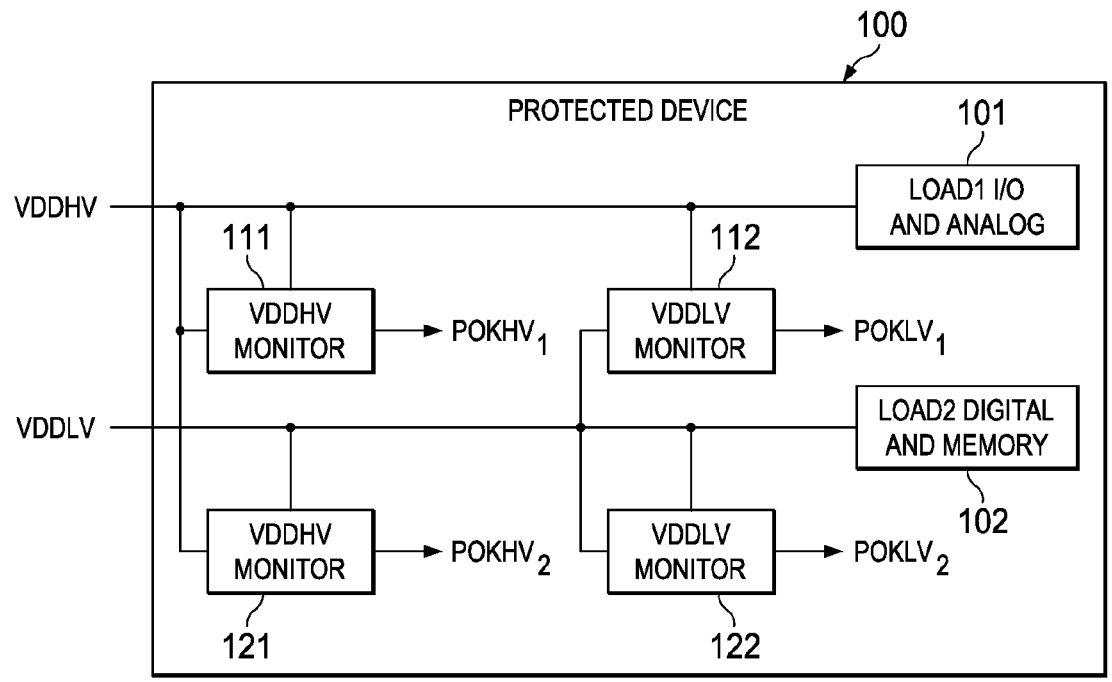
FIG. 1 is a block diagram of an adaption of the prior art voltage monitoring architecture for dual rail battery backed domain.

FIG. 1 illustrates a block diagram of a prior art system. Protected device 100, which may be a part of a larger integrated circuit, includes two power domains. Load1 101 is the first power domain consisting of input/output circuits and analog circuits. Load2 102 is the second power domain consisting of digital logic circuits and memory.

Protected device 100 receives two power supplies. These are high voltage power supply VDDHV and low voltage power supply VDDLV. As illustrated in FIG. 1 load1 101 is powered from the high voltage power supply VDDHV and Load2 102 is powered from the low voltage power supply VDDLV.

High voltage power supply VDDHV is monitored by two voltage monitors. VDDHV monitor 111 produces a signal $POKHV_1$ if the voltage of high voltage power supply VDDHV is lower than an operational high limit level. VDDHL monitor 121 produces a signal $POKHV_2$ if the voltage of high voltage power supply VDDHV is above an operational low limit level. VDDHV monitor 111 is powered from high voltage power supply VDDHV. VDDHL monitor 121 is powered from low voltage power supply VDDLV. If the high voltage power supply VDDHV is at a proper level between the operational low limit level and the operational high limit level both signals $POKHV_1$ and $POKHV_2$ are active.

Low voltage power supply VDDLV is monitored by two voltage monitors. VDDLV monitor 112 produces a signal POKLV1 if the voltage of low voltage power supply VDDLV is lower than an operational high limit level. VDDLV monitor 122 produces a signal $POKLV_2$ if the voltage of low voltage power supply VDDLV is above an operational low limit level. VDDLV monitor 112 is powered from high voltage power supply VDDHV. VDDLV monitor 122 is powered from the low voltage power supply VDDLV. If the low voltage power supply VDDLV is at a proper level between the operational low limit level and the operational high limit level both signals $POKLV_1$ and $POKLV_2$ are active.

The prior art tamper resistant circuit of FIG. 1 duplicates voltage monitor circuits on both supply domains. Voltage monitor circuits 111, 112, 121 and 122 include power on reset circuits and power OK circuits that typically employ an analog comparator and bandgap reference to accurately measure the supply rail voltage. The prior art circuit shown in FIG. 1 is an effective solution but not an efficient solution. This prior art circuit imposes increased the power consumption of the battery backed domain. This is disadvantageous because the battery backed domain typically requires very low average current consumption. The low voltage levels of the digital supply may not be adequate for implementing some of the analog circuits.

Figure 2:
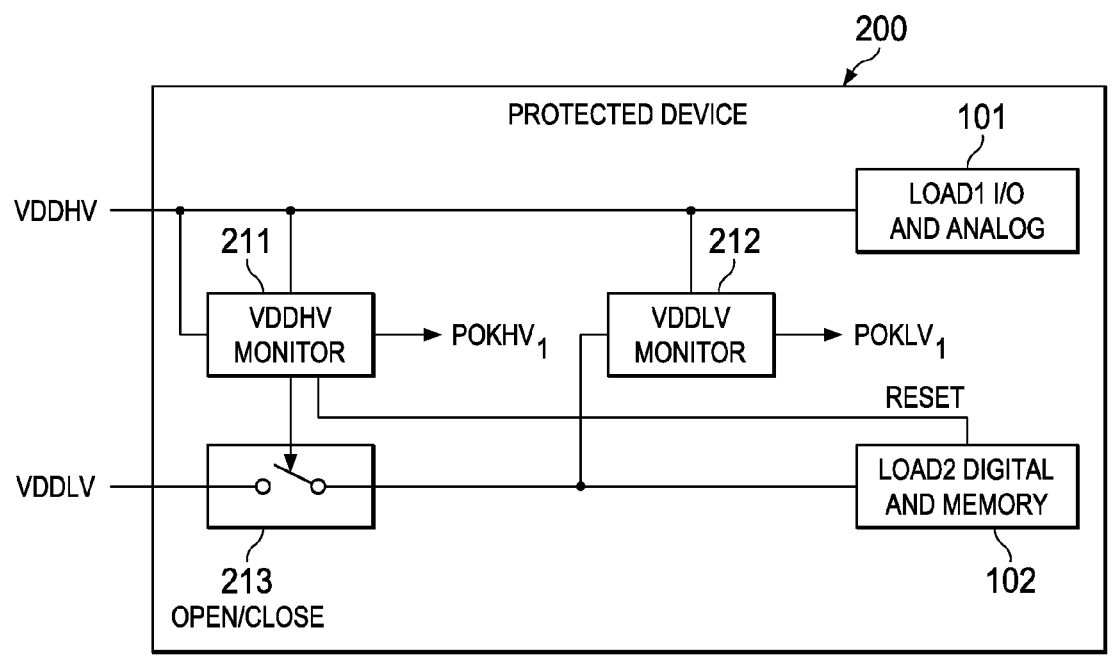
FIG. 2 is a block diagram of a method supplying dual rails without compromising security and hardware efficiency of this invention.

FIG. 2 illustrates a block diagram of a system according to this invention. Protected device 200, which may be a part of a larger integrated circuit, includes two power domains. Load1 101 and load2 102 are the same as illustrated in FIG. 1. Protected device 200 receives the same power supplies high voltage power supply VDDHV and low voltage power supply VDDLV as illustrated in FIG. 1. Load1 101 is powered from the high voltage power supply VDDHV and load2 102 is powered from the low voltage power supply VDDLV.

High voltage power supply VDDHV is monitored by voltage monitor VDDHV 211. VDDHV monitor 211 produces a signal $POKHV_1$ if the voltage of high voltage power supply VDDHV is lower than an operational high limit level. Low voltage power supply VDDLV is monitored by voltage monitor VDDLV 212. VDDLV monitor 122 produces a signal $POKLV_2$ if the voltage of low voltage power supply VDDLV is above an operational low limit level. VDDHV monitor 211 is powered from high voltage power supply VDDHV. VDDLV monitor 212 is powered from low voltage power supply VDDLV.

VDDHV monitor 211 also produces a switch control signal controlling the state of switch 213. Switch 213 when open isolates load2 102 from low voltage power supply VDDLV. Switch 213 when closed powers load2 102 from low voltage power supply VDDLV.

In FIG. 2 high voltage power supply VDDHV is considered the main secure domain supply. The second rail is sourced via switch 213 from low voltage power supply VDDLV only if high voltage power supply VDDHV is within the specified voltage levels as detected by voltage monitor 211. If high voltage power supply VDDHV goes out of its normal operation range due to tampering, VDDHV monitor 211 issues a reset to Load2 102 and opens switch 213. This disconnects low voltage power supply VDDLV from Load2 102. Hence any access to memory or a digital circuit within Load2 is prevented by the absence of the high voltage power supply VDDHV. Switch 213 is constructed to prevent low voltage power supply VDDLV from passing through to Load2 102 even if monitor circuits 211 and 212 do not have sufficiently high voltage to operate. Once high voltage power supply VDDHV reaches a high enough voltage to allow low voltage power supply VDDLV pass through to internal circuits via switch 213, monitor circuits 211 and 212 would also be functional.

What is claimed is:

1. An electronic system comprising:
a first power supply having a first voltage level;
a second power supply having a second voltage level lower than said first voltage level;
a first load connected to be powered by said first power supply;
a first voltage monitor circuit connected to said first power supply to be powered by said first power supply and to sense said first power supply, said first voltage monitor circuit generating a first output signal indicating whether said first voltage level of said first power supply is within predetermined limits;
a second voltage monitor circuit connected to said first power supply to be powered by said first power supply, connected to said second power supply to sense said second power supply, said second voltage monitor circuit generating a second output signal indicating whether said second voltage level of said second power supply is within predetermined limits;
a second load;
a power switch connected to said second power supply, said first voltage monitor circuit and said second load, said power switch having a closed state connecting said second power supply to said second load if said first output signal indicates said first voltage level of said first power supply is within said predetermined limits and having an open state isolating said second power supply from said second load if said first output signal indicates said first voltage level of said first power supply not is within said predetermined limits.

2. The electronic system of claim 1, wherein:
said first load includes input and output circuits.

3. The electronic system of claim 1, wherein:
said first load includes analog circuits.

4. The electronic system of claim 1, wherein:
said second load includes digital memory.

5. The electronic system of claim 1, wherein:
said second load includes digital logic circuits.

6. The electronic system of claim 5, wherein:
said first voltage circuit generating a reset signal if said first voltage level of said first power supply not is within predetermined limits; and
said digital logic circuits are connected to said first voltage monitor circuit to reset upon receiving said reset signal from said first voltage monitor circuit.

* * * * *